(12) United States Patent
Morimoto et al.

(10) Patent No.: US 12,038,068 B2
(45) Date of Patent: Jul. 16, 2024

(54) SILENT CHAIN DRIVE DEVICE

(71) Applicant: TSUBAKIMOTO CHAIN CO., Osaka (JP)

(72) Inventors: Takayuki Morimoto, Osaka (JP); Kosuke Yabuki, Osaka (JP); Shigeki Doi, Osaka (JP); Naoki Okamoto, Osaka (JP); Ryosuke Nanri, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/226,412

(22) Filed: Jul. 26, 2023

(65) Prior Publication Data

US 2024/0035548 A1    Feb. 1, 2024

(30) Foreign Application Priority Data

Jul. 29, 2022  (JP) ................................. 2022-121282

(51) Int. Cl.
  *F16G 13/04*    (2006.01)
  *F16H 7/06*    (2006.01)
  *F16H 57/00*    (2012.01)

(52) U.S. Cl.
  CPC ............... *F16G 13/04* (2013.01); *F16H 7/06* (2013.01); *F16H 57/0006* (2013.01)

(58) Field of Classification Search
  CPC ........... F16G 13/04; F16H 7/06; F16H 57/006
  USPC ......................................................... 474/206
  See application file for complete search history.

(56) References Cited

U.S. PATENT DOCUMENTS

| 6,244,983 | B1 * | 6/2001 | Matsuda ................. F16G 13/04 |
| | | | 474/212 |
| 10,001,207 | B1 * | 6/2018 | White ........................ F16G 5/18 |
| 2016/0312855 | A1 * | 10/2016 | Fujiwara ................. F16G 13/06 |
| 2016/0348755 | A1 * | 12/2016 | Ritz ........................ F16G 13/08 |
| 2018/0066731 | A1 * | 3/2018 | Sato ......................... F16G 13/04 |
| 2018/0100561 | A1 * | 4/2018 | Fujishima ............... F16G 13/04 |

FOREIGN PATENT DOCUMENTS

JP    2000-65156 A    3/2000

* cited by examiner

*Primary Examiner* — Gene O Crawford
*Assistant Examiner* — Emily R Kincaid
(74) *Attorney, Agent, or Firm* — WHDA, LLP

(57) ABSTRACT

An object of the present invention is to provide a silent chain drive device that can minimize loss of strength and wear of link plates, as well as prevent the chain from lifting up to achieve better power transmission efficiency. The silent chain drive device includes a silent chain designed for inside flank meshing/inside flank seating, and a sprocket with sprocket teeth. The plurality of link plates in the silent chain, which each have a pair of teeth, are configured to make contact with the sprocket teeth only at the inside flanks of each pair of teeth when the silent chain wraps around the sprocket and meshes with all of the sprocket teeth.

4 Claims, 7 Drawing Sheets

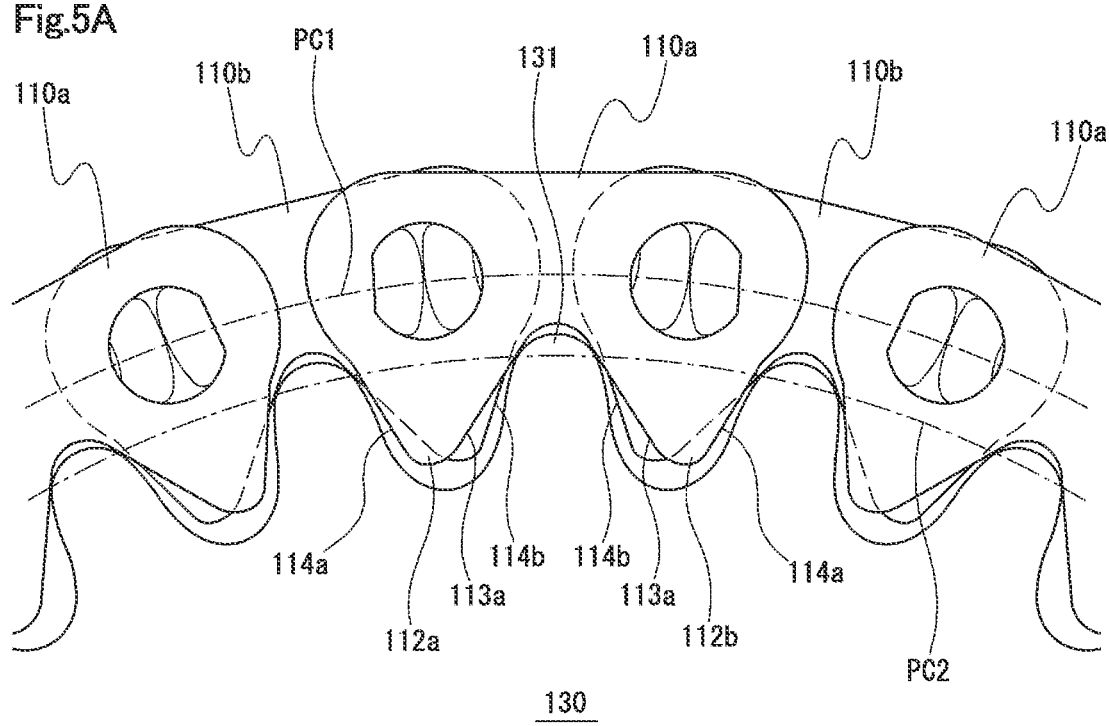
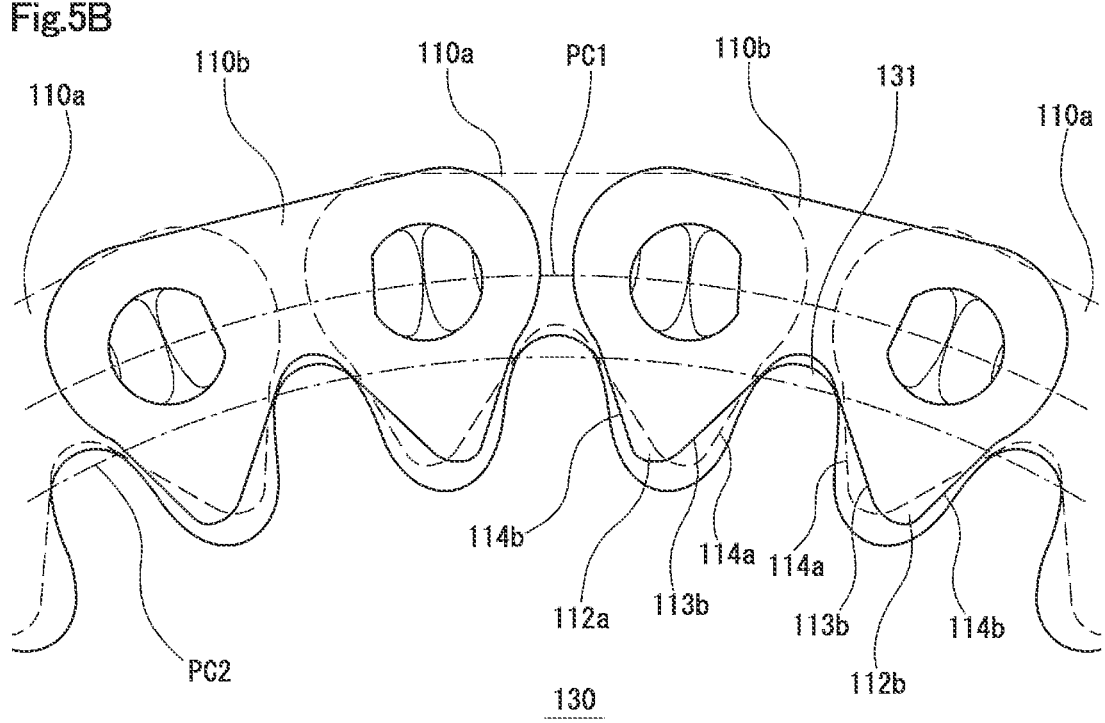

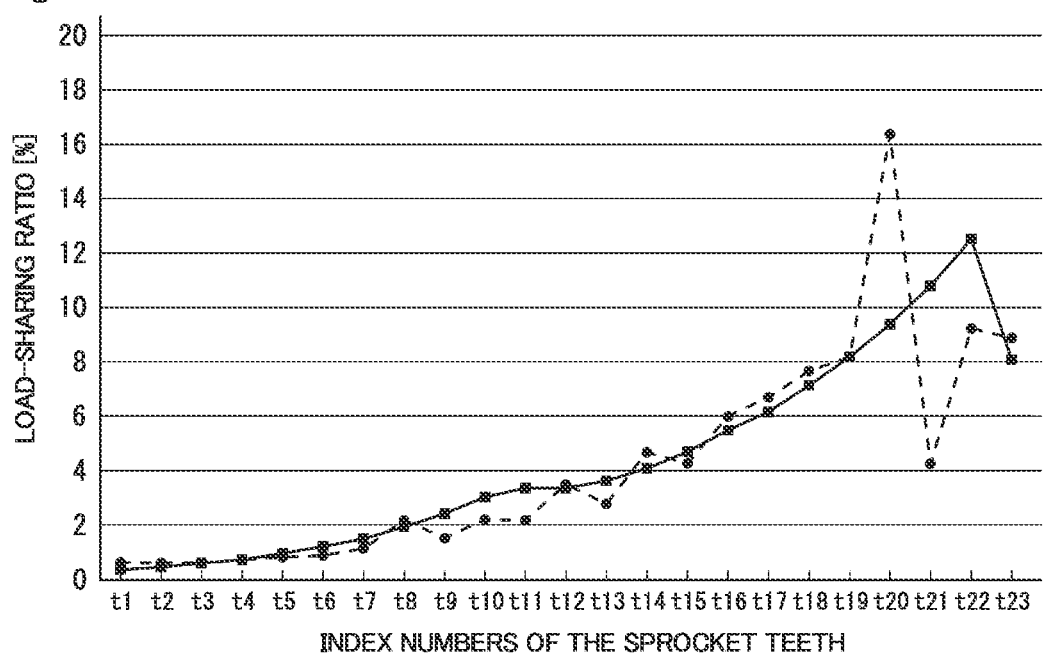

SILENT CHAIN DRIVE DEVICE

BACKGROUND OF THE INVENTION

1. Field of the Invention

The present invention relates to a silent chain drive device, in which the silent chain starts meshing with sprocket teeth at the inside flanks of the link plate teeth and sits on the sprocket teeth at the same inside flanks during power transmission.

2. Description of the Related Art

Chain drive devices that use a silent chain passed around a plurality of sprockets are known and widely used in various applications, such as the transmission of a drive force, synchronization of rotation timing, changeover of RPM or torque, and so on.

A silent chain is typically composed of a large number of link plates, each of which has a pair of teeth and a pair of pin holes. These link plates are articulately coupled together by connecting pins that are inserted in the pin holes.

Silent chain drive devices are classified into various types according to the shape of the link plate teeth. For example, one type of silent chain drive device, in which the link plates start meshing with and sit on the sprocket teeth at the inside flanks of the teeth, is known as inside flank meshing/inside flank seating type (see, for example, Japanese Patent Application Publication No. 2000-065156).

The silent chain drive device of the inside flank meshing/ inside flank seating type generates less noise when the link plates mesh with and sit on the sprocket teeth because there is no transition of meshing points of the link plate teeth on the sprocket teeth between the outside flanks and the inside flanks.

SUMMARY OF THE INVENTION

The conventional silent chain drive device of the inside flank meshing/inside flank seating type has a problem of possible reduction in strength due to stress concentration at the curved crotch portion between the pair of link plate teeth, which may occur if the seating point of the link plates on the sprocket teeth is too close to the distal end and too far from the curved crotch portion acting as a fulcrum.

Therefore, under the circumstances, conventional silent chain drive devices are typically designed as an inside flank meshing/outside flank seating type.

One problem with the silent chain drive device of the inside flank meshing/outside flank seating type is that it is designed with smaller sprockets to achieve a tighter wrap, which causes the chain to lift up, resulting in unfavorable load sharing on the teeth.

Another issue with silent chains is that an increase in articulation angle causes the link plate teeth to extend out in relation to the inside flanks of other link plates adjacent in the chain width direction. This issue imposes structural limitations on the sprockets of the silent chain drive device of the inside flank meshing/outside flank seating type, such as the need for finely designed sprocket teeth.

The present invention was made under the circumstances described above, and it is an object of the invention is to provide a silent chain drive device that can minimize loss of strength and wear of link plates, as well as prevent the chain from lifting up to achieve better power transmission efficiency.

The present invention achieves the above object by providing a silent chain drive device including:
- a silent chain composed of a plurality of alternating link plates stacked in a width direction of the chain and articulately coupled together by connecting pins, the link plates each having a pair of front and rear teeth; and
- a sprocket having a plurality of sprocket teeth for the silent chain to mesh with, wherein
- the silent chain starts meshing with the sprocket teeth at an inside flank of one of the pair of teeth on a front side in a moving direction of the chain and sits on the sprocket teeth at inside flanks of each pair of teeth when transmitting power. The plurality of link plates is configured to make contact with the sprocket teeth only at inside flanks of each pair of teeth when the silent chain is wrapped around the sprocket and meshed with all of the sprocket teeth.

According to the invention set forth in claim 1, the plurality of link plates is configured to make contact with the sprocket teeth only at inside flanks of each pair of teeth when the silent chain is wrapped around the sprocket and meshed with all of the sprocket teeth. This configuration helps achieve inside flank meshing and inside flank seating without the lifting up of the chain.

This configuration also allows the load on the teeth to be distributed evenly among all the link plates, and causes the load to reduce linearly after the seating of the link plates on the sprocket teeth. This helps prevent the link plates from losing strength and minimize wear on the link plates. The more even distribution of the load on the teeth can achieve a better power transmission efficiency.

The configuration according to claim 2 prevents stress concentration at the curved crotch portion between the pair of teeth, which helps prevent a reduction in strength and minimize wear. Furthermore, this configuration reduces the contact force between the pairs of link plate teeth and the sprocket teeth, which helps prevent energy loss and a reduction in power transmission efficiency. In addition, this configuration minimizes displacement of the contact point between the link plates and the sprocket caused by production errors, thereby reducing variations in strength among the link plates and improving the NV (noise and vibration) performance.

The configuration set forth in claim 3 ensures that, even when the articulation angle of the silent chain increases, the teeth of link plates adjacent to one link plate in the chain width direction do not extend beyond the inside flank of that link plate. This enables inside flank meshing and inside flank seating regardless of the number of sprocket teeth used.

The configuration set forth in claim 4 reliably prevents contact between the link plates and the sprocket teeth at the outside flanks of the teeth.

BRIEF DESCRIPTION OF THE DRAWINGS

FIG. 5A is a schematic diagram illustrating the state of one series of guide link plates meshing with the sprocket teeth;

FIG. 5B is a schematic diagram illustrating the state of another series of guide link plates adjacent in the chain width direction meshing with the sprocket teeth;

FIG. 10 is a graph showing the load-sharing ratio of the link plate teeth of the silent chain drive device shown in FIG. 8.

DESCRIPTION OF THE PREFERRED EMBODIMENTS

A silent chain drive device according to one embodiment of the present invention is described below with reference to the drawings.

Figure 1:
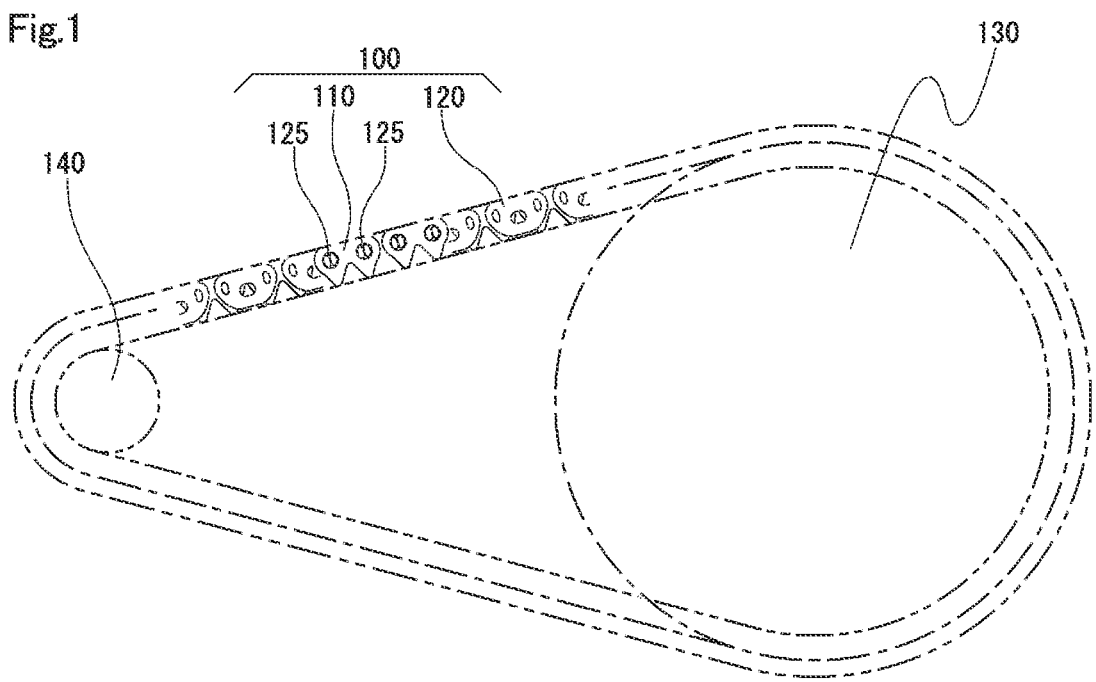
FIG. 1 is a schematic diagram illustrating the configuration of one example of a silent chain drive device according to the present invention.

FIG. 1 is a schematic diagram illustrating the configuration of one example of a silent chain drive device according to the present invention.

This silent chain drive device includes a silent chain 100, and a large sprocket 130 and a small sprocket 140 having different numbers of sprocket teeth and diameters, for the silent chain 100 to mesh with.

The silent chain 100 is composed of a plurality of alternating link plates 110 stacked in the chain width direction and articulately coupled together by connecting pins 125.

Reference numeral 120 in FIG. 1 denotes a guide plate that is disposed on the outermost side in the chain width direction. The guide plate is fixedly fitted to both ends of the connecting pins 125 that loosely fit in the link plates 110 to retain the pins.

Figure 2:
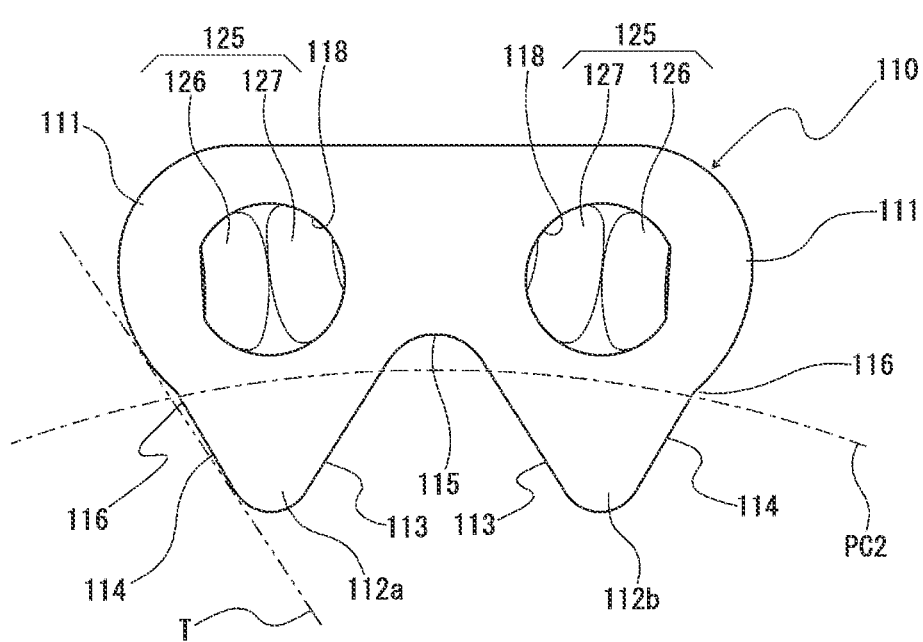
FIG. 2 is a plan view illustrating the configuration of one example of a link plate in the silent chain.

The link plate 110 includes shoulders 111, which are curved surfaces on both front and back sides in the moving direction of the chain, a pair of front and rear teeth 112a and 112b defining a crotch therebetween, and a pair of front and rear pin holes 118, as shown in FIG. 2. The pair of teeth 112a and 112b each has a flat inside flank 113 and a flat outside flank 114.

While the connecting pins 125 used in the silent chain 100 according to this embodiment are rocker joint pins each made up of a rocker pin 126 and a joint pin 127, for example, the connecting pins may be round pins instead.

Figure 3A:
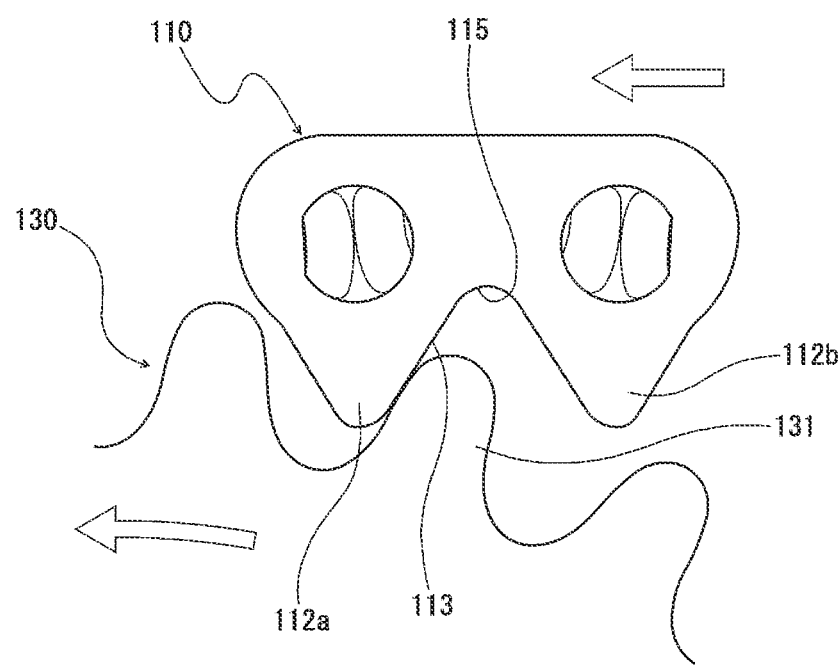
FIG. 3A is a schematic diagram illustrating the state of the silent chain at the onset of meshing with a sprocket tooth.
Figure 3B:
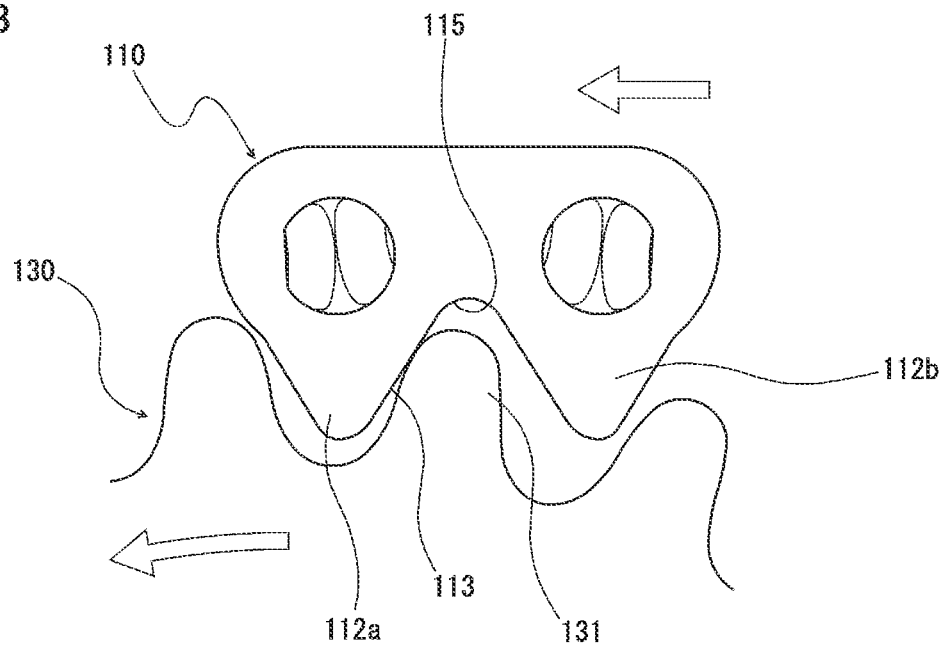
FIG. 3B is a schematic diagram illustrating the state of the silent chain and the sprocket tooth as the meshing proceeds.
Figure 3C:
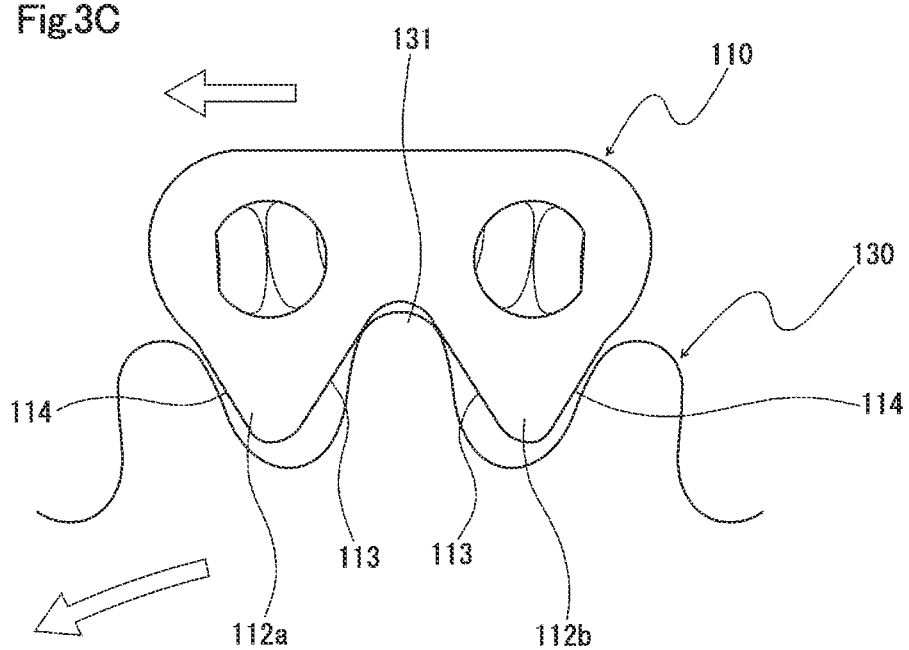
FIG. 3C is a schematic diagram illustrating the state of the silent chain seated on the sprocket tooth.

This silent chain 100 meshes with the large sprocket 130 and small sprocket 140 in a manner known as inside flank meshing and inside flank seating. That is, the silent chain 100 meshes with the large sprocket 130 as follows: in FIG. 3A, the silent chain 100 begins to mesh with a sprocket tooth 131 of the large sprocket 130 at the inside flank 113 of the tooth 112a located on the front side in the moving direction of the chain. As the meshing proceeds, the meshing point moves along the inside flank 113 toward the curved crotch portion 115 between the pair of teeth 112a and 112b, as shown in FIG. 3B. Eventually, in FIG. 3C, the link plate sits on the sprocket tooth at the inside flank 113 of each of the pair of teeth 112a and 112b. Namely, the outside flank 114 of each of the pair of teeth 112a and 112b does not contribute to the meshing. The silent chain 100 meshes with the small sprocket 140 in a similar manner.

Figure 4:
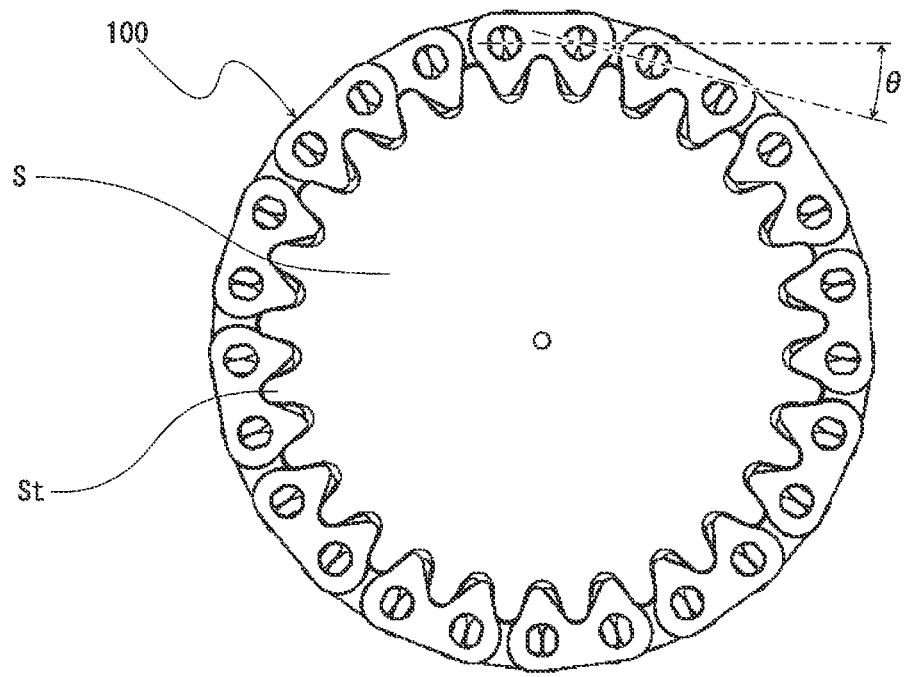
FIG. 4 is a schematic diagram illustrating the state of the silent chain wrapped around a sprocket and meshing with all of the sprocket teeth.

As shown in FIG. 4, this silent chain 100 can wrap around a sprocket S and mesh with all of the sprocket teeth St, regardless of the number of teeth on the sprocket. In other words, the silent chain 100 is capable of achieving inside flank meshing and inside flank seating with both the sprocket teeth 131 of the large sprocket 130, and even the sprocket teeth 141 of the small sprocket 140, which requires the silent chain 100 of a large articulation angle θ.

More specifically, the link plate 110 of this silent chain 100 has an escape portion 116 on the outside flank 114 of each of the pair of teeth 112a and 112b as shown in FIG. 2 for avoiding contact with the sprocket teeth 131 and 141.

In the state in which the link plates 110 of the silent chain 100 are seated on both the sprocket teeth 131 of the large sprocket 130 and the sprocket teeth 141 of the small sprocket 140, the escape portion 116 is curved inward from a tangent T that touches the shoulder 111 and the tooth 112a or 112b, so that the escape portion is positioned more towards the inside in the front to back direction than the inside flank 113 of the teeth 112a and 112b of another link plate 110 adjacent in the chain width direction.

Therefore, when the silent chain 100 is wrapped around the large sprocket 130 and meshed with all of the sprocket teeth 131, a gap is formed between the outside flank 114a of each of the pair of teeth 112a and 112b and the sprocket teeth 131. Each of the plurality of link plates 110a of one series of guide plates aligned along the moving direction of the chain makes contact with the sprocket teeth 131 only at the inside flank 113a of each of the pair of teeth 112a and 112b, as shown in FIG. 5A.

Likewise, each of the plurality of link plates 110b of another series of guide plates aligned along the moving direction of the chain and adjacent in the chain width direction makes contact with the sprocket teeth 131 only at the inside flank 113b of each of the pair of teeth 112a and 112b, with a gap formed between the outside flank 114b of each of the pair of teeth 112a and 112b and the sprocket teeth 131 as shown in FIG. 5B.

The same applies to when the silent chain 100 is wrapped around the small sprocket 140 and meshed with all of the sprocket teeth 141.

The silent chain 100 is preferably engineered with a D2/D1 ratio in the range of 0.9 or more, for example, but less than 1. Here, D1 represents the diameter (chain PCD) of the circle PC1 that encircles the pitch lines of the silent chain 100 wrapped around the sprocket, and D2 represents the diameter (seating point PCD) of the circle PC2 that connects the seating points of the link plates 110 of the silent chain 100 on the sprocket teeth 131 (see FIG. 5A, for instance).

If the chain is designed with a D2/D1 ratio of less than 0.9, the distance from the curved crotch portion 115 acting as the fulcrum to the seating point will become large, which will result in stress concentration at the curved crotch portion 115 and compromise the strength of the link plates 110. As a result, the inside flanks 113 of the link plates 110 and the sprocket teeth 131 and 141 may suffer wear more easily, and the power transmission efficiency may reduce.

Figure 6:
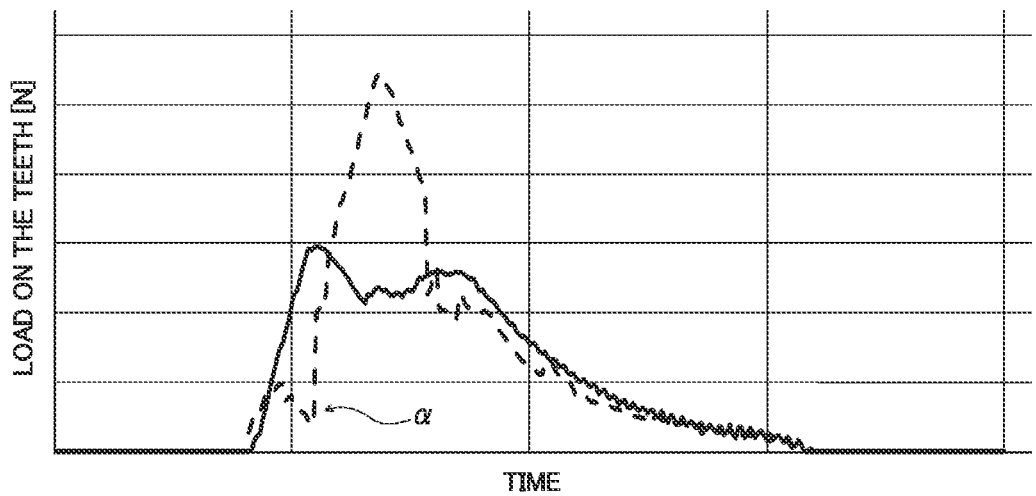
FIG. 6 is a graph that plots the change in load on the teeth of a single link plate in the silent chain of the present invention against time, from the onset of engagement with a sprocket tooth until disengagement.

According to the silent chain drive device described above, the load (contact force) applied to the teeth 112a and 112b of the link plates 110 when meshing with the sprocket teeth 131 and 141 can be reduced, and the change in load on the teeth over time from the onset of engagement until disengagement can be made more gradual, as shown by the solid line curve in FIG. 6.

The broken line in FIG. 6 shows a fluctuation a in load, which indicates that in the conventional silent chain drive device, where the link plates start meshing with the sprocket at the inside flanks and sit on the sprocket at the outside flanks, the chain lifts up as it winds around the sprocket. In the silent chain drive device according to this embodiment, the chain does not lift up as it winds around the sprocket, and therefore the load on the teeth reduces linearly after the seating of the link plates 110 on the sprocket teeth 131 (141).

Figure 7:
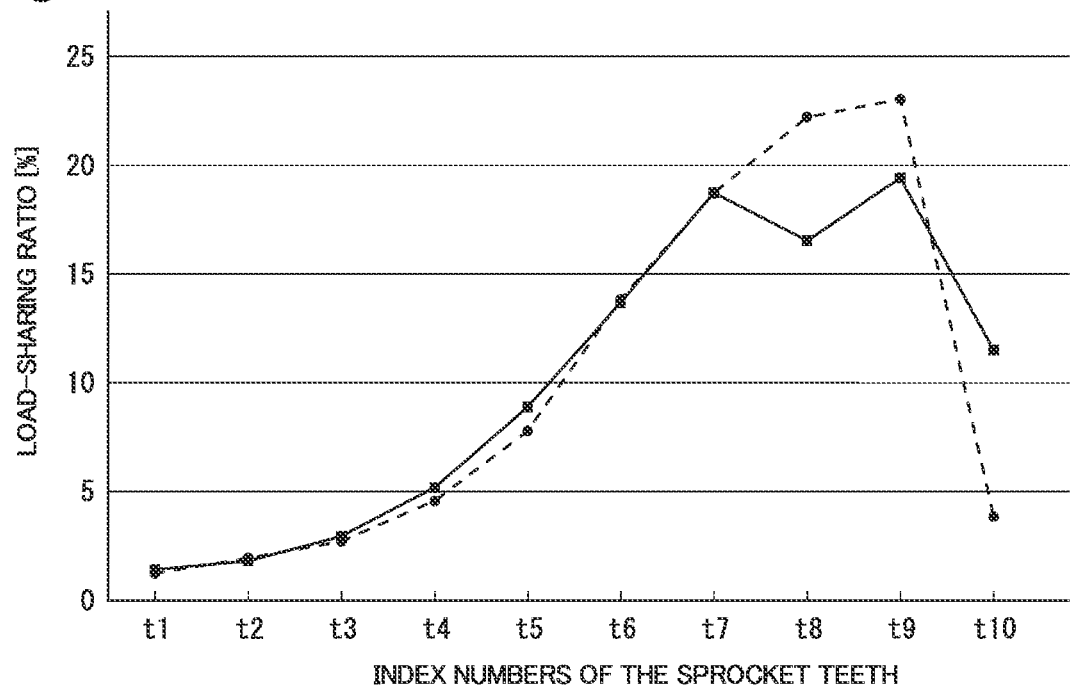
FIG. 7 is a graph showing the load-sharing ratio of the link plate teeth of the silent chain according to the present invention.

Even when the silent chain 100 wraps around the small sprocket 140 with a larger articulation angle, the load on the teeth can be evenly distributed among all the link plates 110 that mesh with the sprocket teeth 141, as shown by the solid line curve in FIG. 7.

The horizontal axis in FIG. 7 represents the index numbers of the sprocket teeth, starting from sprocket tooth t1 at the onset of meshing. The vertical axis represents the load-sharing ratio of the sprocket teeth t1 to t10.

While one embodiment of the present invention has been described above in detail, the present invention is not limited to the embodiment above and may be carried out with various design changes without departing from the scope of the present invention set forth in the claims.

Figure 8:
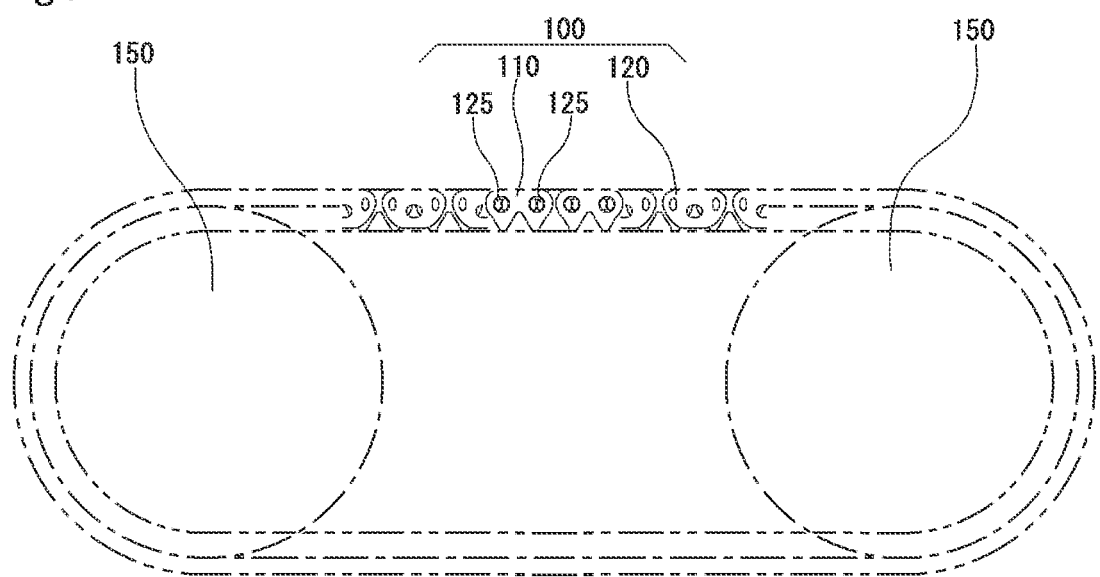
FIG. 8 is a schematic diagram illustrating the configuration of another example of a silent chain drive device according to the present invention.

While one silent chain drive device that has a speed ratio has been described in the embodiment above, the invention is also applicable to a silent chain drive device with no speed ratio, i.e., with the silent chain 100 passed around sprockets 150 having the same number of sprocket teeth and outside diameter as shown in FIG. 8.

Figure 9:
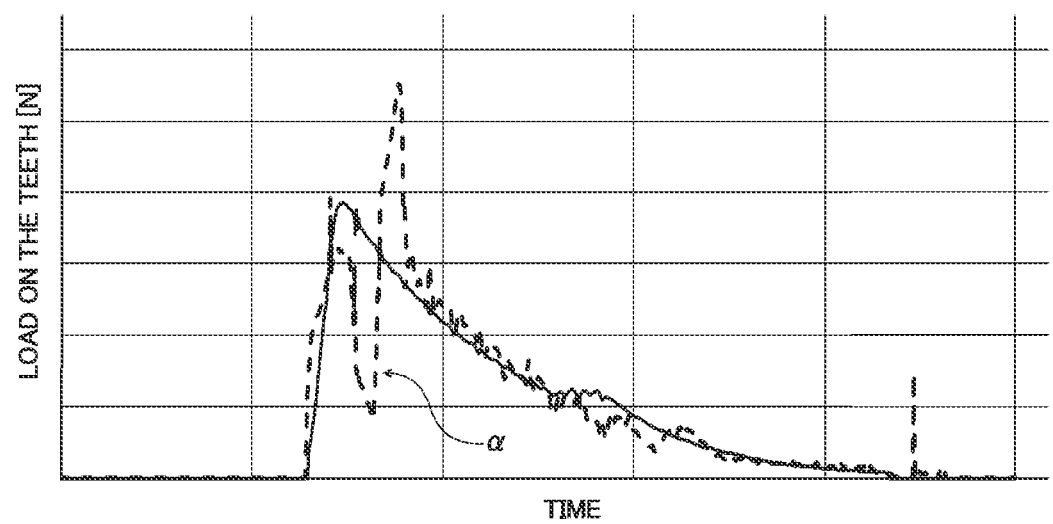
FIG. 9 is a graph that plots the change in load on the teeth of a single link plate in the silent chain drive device shown in FIG. 8 against time, from the onset of engagement with a sprocket tooth until disengagement.

In the silent chain drive device according to this embodiment, too, the load applied to the teeth of the link plates 110 when meshing with the sprocket teeth can be reduced, as shown by the solid line curve in FIG. 9. The change in load on the teeth over time from the onset of engagement until disengagement can also be made more gradual. The chain does not lift up as it winds around the sprocket, which helps achieve a linear reduction of the load on the teeth after the seating of the link plates 110 on the sprocket teeth. As shown by the solid line curve in FIG. 10, the load can be evenly distributed among all the link plates 110 that mesh with the sprocket teeth.

The broken line curves in FIG. 9 and FIG. 10 show the results obtained with a conventional silent chain drive device with inside flank meshing/outside flank seating. The fluctuation a in load on the teeth in FIG. 9 is caused by a lifting up of the chain. The horizontal axis in FIG. 10 represents the index numbers of the sprocket teeth starting from sprocket tooth t1 at the onset of meshing. The vertical axis represents the load-sharing ratio of the sprocket teeth t1 to t23.

What is claimed is:
1. A silent chain drive device comprising:
a silent chain composed of a plurality of alternating link plates stacked in a chain width direction and articulately coupled together by connecting pins, the link plates each having a pair of front and rear teeth; and
a sprocket having a plurality of sprocket teeth for the silent chain to mesh with, wherein
the silent chain starts meshing with the sprocket teeth at an inside flank of one of the pair of teeth on a front side in a moving direction of the chain and sits on the sprocket teeth at inside flanks of each pair of teeth when transmitting power,
the plurality of link plates configured to make contact with the sprocket teeth only at inside flanks of each pair of teeth when the silent chain is wrapped around the sprocket and meshed with all of the sprocket teeth.
2. The silent chain drive device according to claim 1, wherein a D2/D1 ratio is in a range of 0.9 or more and less than 1, where D1 represents a diameter of a circle encircling pitch lines of the silent chain wrapped around the sprocket, and D2 represents a diameter of a circle that connects seating points of the link plates of the silent chain on the sprocket teeth.
3. The silent chain drive device according to claim 1, wherein the plurality of link plates each include an escape portion on an outside flank of each of the pair of teeth for avoiding contact with the sprocket teeth.
4. The silent chain drive device according to claim 3, wherein the escape portion of each link plate of the silent chain is positioned more inside in a front to back direction than an inside flank of a tooth of another link plate adjacent in the chain width direction when the link plates are seated on the sprocket teeth.

* * * * *